(12) United States Patent
Strehlow et al.

(10) Patent No.: US 10,327,465 B2
(45) Date of Patent: Jun. 25, 2019

(54) SWEETENER PARTICLES, SWEETENER PARTICLE COMPOSITIONS, AND RELATED METHODS OF PREPARATION AND USE

(71) Applicant: General Mills, Inc., Minneapolis, MN (US)

(72) Inventors: Dena K. Strehlow, Maple Grove, MN (US); Patrick C. Dreese, Plymouth, MN (US); Stefan Bucher, Maple Grove, MN (US); Fern A. Panda, White Bear Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 706 days.

(21) Appl. No.: 13/944,185

(22) Filed: Jul. 17, 2013

(65) Prior Publication Data
US 2015/0024092 A1    Jan. 22, 2015

(51) Int. Cl.
| | |
|---|---|
| *A23L 27/00* | (2016.01) |
| *A23L 27/30* | (2016.01) |
| *A23P 20/10* | (2016.01) |
| *A23L 7/122* | (2016.01) |
| *A23L 7/161* | (2016.01) |

(52) U.S. Cl.
CPC .............. *A23L 27/30* (2016.08); *A23L 7/122* (2016.08); *A23L 7/161* (2016.08); *A23L 27/33* (2016.08); *A23L 27/72* (2016.08); *A23P 20/10* (2016.08)

(58) Field of Classification Search
CPC ........ A23L 1/0047; A23L 1/1641; A23L 1/18; A23L 1/22016; A23L 1/236; A23L 27/30; A23L 27/33; A23L 27/72; A23L 7/122; A23L 7/161; A23P 20/10
USPC .................................................. 426/96, 103
See application file for complete search history.

(56) References Cited

U.S. PATENT DOCUMENTS

| | | | |
|---|---|---|---|
| 3,246,990 A | 4/1966 | Thompson et al. | |
| 3,464,827 A | 9/1969 | Tsuchiya et al. | |
| 3,600,193 A | 8/1971 | Glabe et al. | |
| 3,687,687 A | 8/1972 | Liepa et al. | |
| 4,415,596 A | 11/1983 | Anderson et al. | |
| 4,824,681 A | 4/1989 | Schobel et al. | |
| 4,828,856 A | 5/1989 | Willard | |
| 4,828,857 A | 5/1989 | Sharma et al. | |
| 5,061,320 A | 10/1991 | Goodacre et al. | |
| 5,342,188 A | 8/1994 | Zimmermann | |
| 6,461,659 B1 * | 10/2002 | Zhou | A23L 27/33 426/103 |
| 2002/0117552 A1 | 8/2002 | Traylor | |
| 2004/0180068 A1 | 9/2004 | Popplewell et al. | |
| 2005/0226983 A1 | 10/2005 | Bakal et al. | |
| 2005/0266142 A1 | 12/2005 | Green et al. | |
| 2006/0110493 A1 | 5/2006 | Schnieber et al. | |
| 2008/0014331 A1 | 1/2008 | Badalov | |
| 2008/0317918 A1 | 12/2008 | Long et al. | |
| 2009/0297670 A1 * | 12/2009 | Baniel | A23L 1/22041 426/96 |
| 2010/0173051 A1 | 7/2010 | Froseth et al. | |
| 2011/0081451 A1 | 4/2011 | Siegal et al. | |
| 2012/0225165 A1 | 9/2012 | Nack et al. | |

FOREIGN PATENT DOCUMENTS

| | | |
|---|---|---|
| WO | WO 94/16578 | 8/1994 |
| WO | WO 98/15192 | 4/1998 |
| WO | WO 2011/011271 | 7/2010 |
| WO | WO 2013/082019 | 6/2013 |

OTHER PUBLICATIONS

Lees and Jackson; Sugar confectioner and Chocolate Manufacture; Leonard Hill books, 1973, pp. 15-16.*
Desi et al., "Recent Developments in Microencapsulation of Food Ingredients" Drying Technology, 23: pp. 1361-1394, 2005.
Saleh et al., "Coating and Encapsulation Processes in Powder Technology" Chem. Eng. Dept., CNRS-UMR 6067, BP 20259, 60205 Compiegne, France, pp. 323-362, 2007, ISBN:0-444-51871-1.
Deis, "Spray-Drying Innovative Use of an Old Process" pp. 1-7, Copyright 2013 by Virgo Publishing, htt://www.foodproductdesign. com, posted May 1, 1997.

* cited by examiner

*Primary Examiner* — Jyoti Chawla
(74) *Attorney, Agent, or Firm* — Gregory P. Kaihoi, Esq.; Diederiks & Whitelaw, PLC

(57) ABSTRACT

Described are coated food products having a sweet coating, such as a (e.g., sucrose, fructose, or the like) coating, the coating containing core-shell sweetener particles that include a sweetener layer at an exterior; also described are related methods of preparing the coated food product and the core-shell sweetener particles.

22 Claims, 2 Drawing Sheets

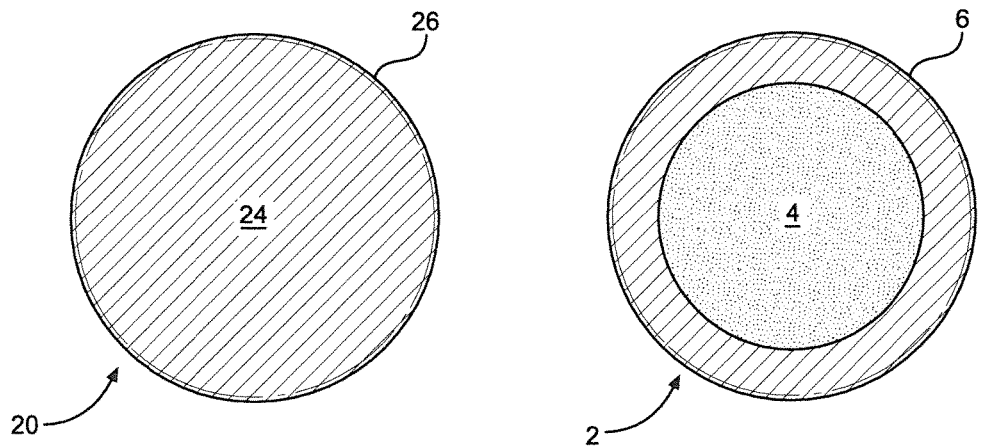
FIG. 1A
PRIOR ART
FIG. 1B
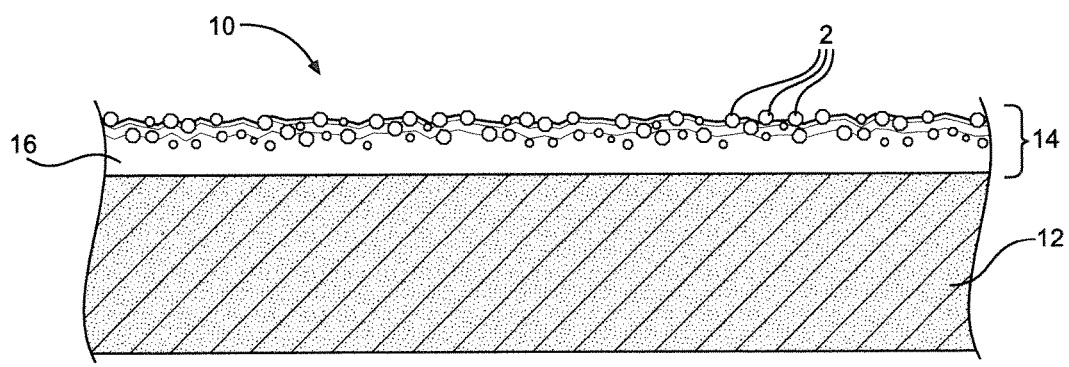
FIG. 2

SWEETENER PARTICLES, SWEETENER PARTICLE COMPOSITIONS, AND RELATED METHODS OF PREPARATION AND USE

FIELD OF THE INVENTION

The present description is directed to edible core-shell sweetener particles, edible sweetener compositions that contain the core-shell sweetener particles, food products that contain the core-shell sweetener particles, and methods of making the core-shell sweetener particles, sweetener compositions, and food products. Particular embodiments are directed to core-shell sweetener particles that include an edible core and a sweetener layer over the exterior of the particle. The core-shell sweetener particles can be useful in any of various food products such as candies, snack foods, baked goods, pre-sweetened ready-to-eat breakfast cereal products, other sweetened food products, and related methods.

BACKGROUND

Many food products include sweetener ingredients made of sugar or non-sugar sweeteners, especially in the form of solid particulate sweeteners, as with powdered sugar. The solid sweetener particulates are generally made of a sugar, and each particulate is solid and homogeneous sugar material. The solid sweetener particles may be included in a dough or a batter, or may be included in a sugar (or other sweetener) coating applied to a surface of a food product, placing the sweetener particles at the exterior surface of the food piece. Examples of foods that include sugar or sweetener coatings with sweetener particles at an exterior surface include snack foods; candies such as those that contain a sweet or sour powdered coating; baked goods such as cookies (e.g., sugar cookies), donuts (e.g., powdered sugar-coated donuts), and other pastries; bars such as lemon bars, brownies, and the like; and ready-to-eat pre-sweetened breakfast cereals.

Commercial preparers of sweetened food products continuously desire to make their food products easier or more efficient to manufacture (e.g., lower cost), more healthful, or otherwise more desirable to consumers. One way that food products are sometimes made more desirable is by reducing the amount of sugar in the food.

In opposition to interest in improving manufacturing efficiency, lowering cost, and reducing sugar content, is that expectation that changes made to a product composition (e.g., ingredient) or its method of preparation will often be reflected in the finished food product. Changes in the composition or preparation of commercial products should be of a type or degree that do not negatively impact consumer perception of the product, especially if the product is an established commercial product such as a well-known breakfast cereal. Consumers come to know a product or product type based on taste, physical appearance, texture, cosmetic appearance (color, sheen), and overall look and feel. A change in the composition of a well-known food product such as a breakfast cereal may be healthful or otherwise desired, but may not be commercially acceptable if the change also produces a noticeable change in the taste, physical appearance (e.g., color), texture, or overall look and feel of the cereal.

A sugar coating at an exterior of a ready-to-eat breakfast cereal can be particularly susceptible to undesired affects caused by a formulation change, because the sugar coating is highly visible and is often a major constituent of a sugar-coated breakfast cereal. In pre-sweetened breakfast cereals that contain sugar coatings, a large portion of the breakfast cereal may be made up of a sugar coating (often powdered sugar), sometimes up to 25 or 35 weight percent of the cereal, or more. Consequently, a change to this part of the pre-sweetened cereal piece, for example a change to the sugar or powdered sugar ingredient, may have a significant impact on the taste, appearance, or other property of the sugar coated cereal piece.

As an example, certain types of breakfast cereals include coatings of applied sugar (or other sweetener) particles, e.g., in the form of fine solid sugar particles such as powdered sugar or the like. The coated powder material provides desired flavor to the coated cereal pieces, i.e., sweetness, but also inescapably affects one or more other product features such as color (dry, or in milk), density or bulk of the cereal pieces, sheen, moisture resistance, and others. A food producer desirous of reducing the amount of sugar in the coating will wish to avoid altering the color, density, bulk, sheen, or moisture resistance of the cereal pieces, to the extent possible, especially in an established product for which consumers have existing expectations as to these properties. As a result, reducing the amount of sugar in a sugar-coated breakfast cereal is a difficult challenge. If a portion of sugar in a sugar coating is removed, that portion of sugar must be replaced to avoid a reduction in sweetness. Additionally, however, the removed amount of sugar must also be replaced as to its physical presence and properties, to avoid an undesired change in the color, density, bulk, moisture resistance, or other mechanical or physical properties of the coated cereal piece, to ensure product consistency. The alternative, allowing any one of the look, feel, bulk, taste, density, sheen, etc., of the cereal product to become altered, either increased or decreased, improved or otherwise, may not be a practical or desired option when working with an established commercial product.

Powdered sugar is a common ingredient in food products, including for use in sugar coatings at a surface of a food product. As an example, RTE cereals include powdered sugar in sugar coatings on an exterior surface of cereal pieces to increase sweetness of the cereal. The powdered sugar is responsible for flavor (sweetness), but also inherently adds other noticeable properties to a food product coated with powdered sugar; these properties can include color (powdered sugar is white), bulk (due to the density of the powdered sugar), sheen, moisture resistance, and texture of the sugar coating.

For various reasons, food producers may desirably wish to reduce the total amount of sugar, e.g., sucrose, fructose, etc., in a food product such as a sugar-coated breakfast cereal. In breakfast cereal products, this can mean reduced sucrose in a sugar coating. One reason to reduce sugar is to include a reduced level of total sugar in the food product, considered to be generally desirable as healthy. Additionally, sugars such as sucrose and fructose can be expensive. Reducing the amount of sugar in a food product, therefore, would be desired as being both potentially healthful and cost effective, especially if the reduction can be accomplished without negatively affecting other properties of the food product. Ongoing interest exists to reduce the amount of sugar (typically sucrose or fructose) in foods, such as but not exclusively meaning pre-sweetened breakfast cereals, while maintaining other physical and mechanical properties of the food product. Pre-sweetened cereal products with reduced levels of sugar would desirably exhibit efficient preparation and processing, desired texture, flavor (sweetness), bowl life, and other eating qualities, and visual appearance, at least comparable to previous pre-sweetened cereal products containing standard levels of sucrose.

SUMMARY

The invention relates to core-shell sweetener particles and their preparation and various uses and compositions containing the core-shell sweetener particles. The core-shell sweetener particles include an edible core and a sweetener layer at an exterior. The sweetener layer is made of a concentrated amount of sweetener such as sugar to allow the core-shell sweetener particles to be used in a food product to give the food product a sweet flavor.

The core-shell sweetener particles can be useful, in particular embodiments, in a sweetener composition that contains the core-shell sweetener particles and that can optionally contain additional ingredients such as additional particle ingredients, e.g., additional non-sweetener particle ingredients. The sweetener composition can be in the form of a powder (also referred to as a "dust," dust composition, or "sweet powder") that contains the core-shell sweetener particles in a relatively dry and flowable composition that can be applied to a food product by coating methods such as dry coating methods. The core-shell sweetener particles can be coated to an exterior surface of the food product, so the core-shell sweetener particles remain intact in their core-shell structure and, for example, do not become dissolved. Alternately, the powder or other form of sweetener composition can be added to a food product as an ingredient that is not in a coating form, also in a manner such that the core-shell structure of the sweetener particle remains intact and the particles do not become dissolved.

The core-shell sweetener particles include sweetener, such as a sugar, at the exterior surface of the particles. The sweetener at the surface provides the particles with desired sweet flavor when ingested by a consumer, specifically when the exterior surface contacts the tongue of the consumer where the sensory perception of the tongue can identify the sweetener on the exterior surface and perceive the sweet flavor. The exterior surface (i.e., the sweetener layer or "shell") will be the portion of the particle that is experienced by the consumer upon placing the food product on the tongue. The interior ("core") of the particle is less likely or unlikely to ever be sensed by the tongue of a consumer, so the flavor of the interior or core is less important or completely un-important. Therefore, instead of the core being made of sweetener, the core can advantageously be made of a different edible food ingredient that is not required to perform the function of a sweetener. The core can be made of edible food ingredient selected to exhibit desired non-taste properties; in certain embodiments, therefore, the core can be made of edible food ingredient selected to exhibit non-taste (physical and mechanical) properties that are similar to a sugar or other sweetener that the core is designed to replace, meaning the non-taste properties of a core of a solid sweetener particle.

For example, for a core-shell sweetener particle designed to replace a solid sweetener particle made of solid homogeneous sucrose, the core can be made of a non-sweetener ingredient that exhibits physical properties similar to the sucrose at the core of the solid powdered sugar particle. (Core-shell sweetener particles designed to replace sweeteners other than sucrose can include a non-sweetener core that exhibits physical properties similar to the non-sucrose sweetener.) Advantageously, the core does not contribute to the sugar (or sweetener) content of the core-shell sweetener particle, a sweetener composition that contains the core-shell sweetener particle, or a food product that contains the core-shell sweetener particle.

In certain specific embodiments, a sweetener composition (e.g., dust or powder that contains a majority or substantially entirely core-shell sweetener particles) may be useful as a substitute for standard (e.g., 100 percent sucrose) powdered sugar. Such a sweetener composition may contain core-shell sweetener particles that exhibit size, bulk density, and particle density properties that are similar to those of the solid sucrose particles of the powdered sugar. Taste properties of the coated sweet powder can be the same or comparable to the powdered sugar, by placing sucrose at the sweetener layer exterior of the sweetener particles. Overall, the sweet powder can provide taste and non-taste properties that are similar to or identical to the properties of a powdered sugar, but the sweet powder—with core-shell sweetener particles that have non-sugar cores—contains a lower total amount of sugar than the powdered sugar, which contains solid sucrose particles.

The present core-shell sweetener particles, compositions, and methods can be useful generally with various food products, particularly food products that place sweetener at an outer surface of the food; the core-shell sweetener particles can be placed at an outermost exterior surface of such a food product, in an un-dissolved condition and having the core-shell structure intact, when eaten, so that the exterior of the core-shell sweetener particles comes into contact with the tongue of the consumer. Examples of such food products include ready-to-eat breakfast cereals, snacks, bars, baked goods (e.g., cookies, donuts, etc.), and other food compositions that include sweetener at a surface. Certain embodiments of the core-shell sweetener particles, compositions, and methods may be particularly useful with breakfast cereal products and products such as snack products that contain breakfast cereal pieces having a sweetener coating. Accordingly, while the following description applies to many different types of foods, much of the description will relate specifically to breakfast cereals, e.g., dry, sugar-coated "ready-to-eat" breakfast cereals. This is not to be considered to limit the invention to its specific but exemplary utility in the area of breakfast cereals.

Ready-to-eat ("RTE") breakfast cereals are popular packaged food items. RTE cereals exist in a large number of different varieties and can be grouped into different categories including puffed and unpuffed cereals, cereals based on particular types of grains, based on the shape or method of forming cereal pieces, or based on whether or not a cereal includes a sugar coating. RTE cereals are often described in terms of shapes such as flakes, shreds, biscuits, squares, puffs, granola cereals, etc. RTE cereals are often described in terms of the principal cereal ingredient from which they are prepared, e.g., wheat, rice, corn, oats, or other major cereal grains. Other categorizations include puffed or unpuffed; whole grain or not; made from whole kernel pieces or from cooked cereal doughs; organic or not; pre-sweetened or not; etc. The core-shell sweetener particles and related methods as described herein can be useful with all varieties and variations of dried cereal pieces, either as an ingredient used to make the dried cereal piece, or, as more specifically referenced in the present description, as part of a sugar coating at a surface of the dried cereal pieces.

In various embodiments, the present description relates to food ingredients (e.g., sweet powder) and sugar-coated food products that contain core-shell sweetener particles as a replacement or substitute for solid sweetener particles, e.g., solid sucrose particles generally included in powdered sugar.

The food product containing the core-shell sweetener particles as a substitute for some or all of an amount of solid (powdered) sugar particles can contain a reduced amount of total sugar (e.g., sucrose) relative to a comparable product that contains the solid (powdered) sugar particles (and no core-shell sweetener particles). In particularly preferred coated food products the taste and appearance of the food products—containing core-shell sweetener particles and a reduced amount of total sugar—can be similar or comparable to the taste and appearance of the food product containing the solid (powdered) sugar particles and a higher total amount of sugar.

Certain specific examples of the core-shell sweetener particles can include a core made of non-sweet food ingredient such as non-sugar carbohydrate (or other non-sugar food ingredient), and a sweetener layer that contains sweetener (e.g., nutritive carbohydrate sweetener such as sucrose, fructose, or a combination of sucrose and fructose; artificial sweetener; natural sweetener; or a combination of any of these). Exemplary food products include breakfast cereal pieces having a sugar coating. The sugar coating can include the core-shell sweetener particles, with intact core-shell structure, and an optional adherent layer located on at least a portion of a surface of the food pieces. The adherent layer can include an edible material capable of holding the core-shell sweetener particles at a surface of the food product and may include any useful edible food ingredient such as a fat, a sugar, carbohydrate, protein, polysaccharide, or a combination of two or more of these.

In one aspect the invention relates to a powder composition containing core-shell sweetener particles having an edible core and a sweetener layer on the edible core and at a particle exterior. The sweetener particles include less than 80 weight percent sweetener based on total weight sweetener particles.

In another aspect the invention relates to a method for preparing a food product. The method includes: providing a food piece having an exterior surface; applying powder composition to the exterior surface, the powder composition comprising core-shell sweetener particles having an edible non-sweet core and a sweetener layer on the edible core.

BRIEF DESCRIPTION OF THE DRAWINGS

FIG. 1A shows an example of a (prior art) solid sweetener particle.

FIG. 1B shows an example of a core-shell sweetener particle according to the present description, including an edible core and a sweetener layer.

FIG. 2 shows an example of a coated food product.

Figure 3A:
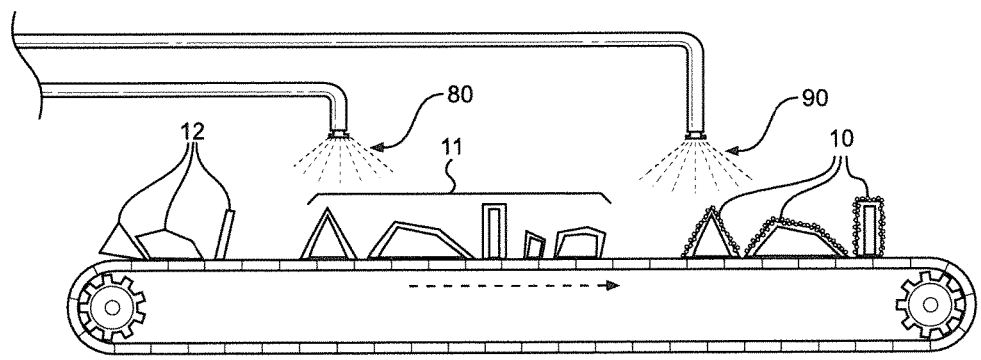
FIG. 3A shows an example of a method of coating a coated food piece.

All drawings are schematic and not to scale.

DETAILED DESCRIPTION

The following description relates to core-shell sweetener particles, sweetener compositions that contain the core-shell sweetener particles, food coatings and food products that contain the core-shell sweetener particles or sweetener compositions, and related methods of preparing these. Core-shell sweetener particles of the present description include an edible core and a sweetener layer at an exterior. Such particles are referred to herein as "core-shell sweetener particles," in contrast with prior art "solid sweetener particles" such as the one shown at FIG. 1A. The sweetener layer of the core-shell sweetener particles contains sweetener in an amount to effect a desired level of sweetness upon consumption, for example a concentrated amount of nutritive carbohydrate sweetener such as sugar. A sweetener composition that contains the core-shell sweetener particles can optionally contain additional ingredients such as additional (non-sweetener) particle ingredients. The sweetener composition can be in the form of a powder or dust composition that contains the core-shell sweetener particles in a relatively dry and flowable composition that can be applied to a food product by coating methods such as dry coating methods.

A sweetener composition that contains the core-shell sweetener particles can be used as an ingredient in a food product, for example as part of a coating at a surface of a food product. In use as a food product ingredient, the core-shell sweetener particles can provide a sweetening effect comparable to prior art solid sweetener particles made entirely of the sweetener used to make the sweetener layer. But because the core-shell sweetener particles contain a core that can be substantially non-sweet and substantially non-sugar, the food product that contains the core-shell sweetener particles as described herein, instead of comparable solid sweetener particles (of the prior art) will contain a reduced total amount of the sweetener (e.g., sugar). When described herein as part of a sweetener composition, ingredient, food component, food product, or the like, the core-shell sweetener particles are always presumed to be intact in their core-shell structure, e.g., not dissolved or otherwise having been damaged.

The core-shell sweetener particles have an exterior sweetener layer that contains an amount of sweetener (e.g., concentrated sugar) to effect a sensory (taste) response in a consumer that is comparable to a sensory response produced by otherwise similar solid particles of the same material that makes up the sweetener layer located at the exterior of the core-shell sweetener particles; if the core-shell sweetener particles have pure sugar (e.g., sucrose) at the exterior surface, the core-shell sweetener particles will produce a sensory response that is comparable to a response that would result from otherwise similar particles of pure, solid sugar (i.e., solid sugar particles), such as the solid sugar particles of a powdered sugar. But because the core-shell sweetener particle core contains a reduced amount of sweetener, e.g., sugar, the total amount of sweetener from core-shell sweetener particles that is required to produce the same or a comparable sensory response (compared to solid sweetener particles) is reduced. In certain embodiments, this allows the core-shell sweetener particles to be useful as a direct substitute or replacement for solid sweetener particles such as those of powdered sugar.

In somewhat more detail, the core-shell sweetener particles include an edible (preferably non-sweet) core and a sweetener layer at an exterior of the particle. Preferred core-shell sweetener particles can include a high concentration of sweetener (e.g., sucrose) in the sweetener layer at the exterior surface of the particles, and a low amount of sweetener (e.g., little or no sucrose, fructose, etc.) at the non-sweet edible core. The non-sweet edible core takes the place of an amount of sweetener (e.g., sugar) in comparable solid sweetener particles, resulting in a significant reduction in the total amount of sweetener (e.g., sugar) in the core-shell sweetener particles relative to a comparable solid sweetener particle. Still, the sweetener layer at the exterior of the sweetener particles is comparable to the exterior of a solid sugar (or other sweetener) particle; as a result, the taste properties of the core-shell sweetener particles can be comparable to the taste properties of the solid sugar (or other sweetener) particles, while containing a substantially reduced amount of sugar (or other sweetener).

For use as a replacement ingredient in a food product, e.g., as a replacement for powdered sugar (or other sweetener ingredient), core-shell sweetener particles can be prepared to exhibit taste properties that mimic those of a powdered sugar by using a high concentration of sugar such as sucrose, fructose, or a combination of sucrose and fructose as the sweetener layer at exterior surfaces of the core-shell sweetener particles. The same core-shell sweetener particles can also be prepared to exhibit non-taste physical and mechanical properties to mimic those of the powdered sugar (or other sweetener ingredient) that the core-shell sweetener particles are designed to replace, including particle size (e.g., average or mean particle size), particle density, bulk density of a collection of core-shell sweetener particles in the form of a dust or powder, particle color either in bulk or when present in the food product (e.g., at a coating on a surface), processing properties, and other functional properties that are comparable to the properties of the sweetener ingredient (e.g., solid sweetener particles) that the core-shell sweetener particles will or may replace. These non-taste properties can be selected by selecting a core that exhibits non-taste properties of the powdered sugar (or other sweetener ingredient).

The core-shell sweetener particles can be formed by any method that will produce particles in the form of the edible core having an exterior layer of sweetener such as concentrated sugar, as described. One contemplated method is to form a collection (e.g., powder composition) of solid particles useful as the edible non-sweet cores, and then to form a sweetener layer on the surface of the non-sweet core particles by any useful coating method. The core and the sweetener layer can be prepared from food ingredients as desired and as described herein. The sweetener layer generally is designed to produce a sweetness response in a consumer upon placing the core-shell sweetener particles (e.g., present in a food product) on the consumer's tongue. The sweetener layer contains an amount of sweetener such that the sweetener particles can be included in a food product to produce a sweet flavor.

Because the core-shell sweetener particles are for use in or as food ingredients, the particles can exclude materials that are not generally regarded as safe (GRAS) for ingestion in a food product. The core-shell sweetener particles also may exclude ingredients that may be present in other types of ingestible particles of similar core-shell structure, such as those useful in non-food products such as pharmaceuticals; in this regard, embodiments of the described core-shell sweetener particles can exclude active pharmaceutical ingredients and chemical additives used in pharmaceutical products that are not also typically used as ingredients in a food product. Preferred core-shell sweetener particle can consist of or consist essentially of the core as described herein, and the sweetener layer, as described, at the exterior of the particles, each being prepared of only GRAS food ingredients; particularly, preferred core-shell sweetener particles can include the sweetener layer at an exterior or outer surface or layer of the core-shell sweetener particles with no additional material placed over the sweetener layer, the core and sweetener layer (shell) being only GRAS food ingredients and excluding non-GRAS ingredients and pharmaceutically active ingredients; the core being made of substantially non-sugar, non-sweet ingredients; and the sweetener layer containing an amount of sweetener useful to provide sweet flavor, such as a concentrated amount of sugar, any useful amount of natural or artificial sweetener, or a combination of two or more of these.

Referring to FIG. 1A, illustrated is a prior art solid sweetener particle 22 made of a solid, e.g., homogeneous sweetener such as sugar, e.g., sucrose, fructose, or a combination of sucrose and fructose. (A solid particle made of sweetener and intended to be a sweetener food ingredient such as this prior art sweetener particle is referred to herein as a "solid sweetener particle.") Other non-sugar sweetener may also be present in the solid sweetener particle or in a composition (e.g., powder) that contains the particle, in a desired amount, such as a synthetic or high-intensity natural sweetener; also optionally included may be a non-sugar, non-sweet food ingredient such as starch, fiber, other carbohydrate, or fat or protein material. As illustrated, solid sweetener particle 20 includes interior 24 that is of the same food ingredient (e.g., sugar) as exterior surface 26, the particle being essentially uniform and homogeneous in composition. When included in a food product, or when otherwise consumed by a consumer, exterior surface 26 will contact the tongue and produce a sweet taste response. Interior 24 may not contact a consumer's tongue, but will contribute to the mechanical and physical properties of the solid sweetener particle 20 and a sweetener composition such as a powder or dust containing a collection of solid sweetener particles 20.

Referring to FIG. 1B, illustrated is a core-shell sweetener particle 2 that includes core 4 and sweetener layer 6. Core 4 and particle 2 are illustrated as spherical, but are not required to be spherical; other shapes of core 4 or particle 2 may also be useful, such as a multi-faceted crystal-shape, a cylindrical shape, cubic, rectangular, etc. As illustrated, core 4 is as described, preferably containing GRAS food ingredients and a low concentration of sugar or no sugar, and sweetener layer 6 containing sweetener, preferably concentrated sugar, and optionally non-sugar natural or artificial sweetener if desired. The core-shell sweetener particle can have relative amounts of core 4 and sweetener layer 6, as desired, preferably to allow a consumer to experience a sweet taste response when sweetener layer 6 contacts his or her tongue upon eating a food product containing core-shell sweetener particle 2. As illustrated, sweetener layer 6 is located at the exterior of sweetener particle 2, with no additional coating over sweetener layer 6.

Referring still to FIG. 1B, sweetener layer 2 is illustrated to be solid, e.g., homogeneous sweetener such as sugar, e.g., sucrose, fructose, or a combination of sucrose and fructose. Other non-sugar sweetener may also be present in sweetener layer 2 in a desired amount, such as a synthetic or high-intensity natural sweetener; also optionally included (though not necessarily preferred) may be an (e.g., relatively small) amount of non-sweetener food ingredient such as starch, fiber, or other carbohydrate or saccharide, protein, or fat material. As illustrated, solid core 4 is of a different composition compared to sweetener layer 6. Preferably, each of core 4 and sweetener layer 6 (while different compositionally) can be essentially uniform and homogeneous as to its own composition. When included in a food product or otherwise consumed by a consumer, the exterior surface of sweetener layer 6 will contact the tongue and produce a sweet taste response. Core 4 may not contact a consumer's tongue but will contribute to the mechanical and physical properties of core-shell sweetener particles 2 and a sweetener composition such as a powder or dust containing a collection of core-shell sweetener particles 2.

In more detail, still by way of example, a core (4) of a core-shell sweetener particle can be made of any food ingredient, preferably not including a sugar ingredient as described herein, (i.e., preferably not including fructose, dextrose, lactose, sucrose, maltose, or galactose), or including sugar in a relatively low amount if at all. The core can be made of a GRAS food ingredient or ingredients that mimic the non-taste functional properties (e.g., physical and mechanical) of known solid sweetener particles such as solid sucrose particles (e.g., as a particle of powdered sugar), but that do not have caloric or other nutritive or metabolic properties of the solid sweetener particles. The core can be made of one or more edible food ingredients that are either less costly or more healthful than a known sweetener, e.g., sucrose, fructose, or other natural or synthetic sweetener.

Ingredients that can be useful for a core can be any food ingredient that can be formed into a core, that can perform as a core particle in a coating process to accept a sweetener layer at a surface of the core particle, and that can exhibit mechanical and physical properties to allow the core, upon placement of the sweetener layer onto the core, to be useful as a food ingredient. For core-shell sweetener particles that will perform as a replacement or substitute for a solid sweetener particle such as powdered sugar, the core can preferably have mechanical and physical properties comparable to those of the interior of the solid sweetener particle, e.g., comparable to a powdered sugar particle.

Specific examples of food ingredients useful in an edible core include carbohydrates such as polysaccharides, oligosaccharides, starch, dextrose, etc.; proteins; fats; fiber, which may be soluble or insoluble, e.g., cellulose or cellulosic materials and derivatives; and any other edible material that can be prepared as a particle to mimic a core of a solid sweetener particle such as a solid powdered sugar particle. Preferred ingredients for a core may be relatively cheap (compared to sugar, e.g., sucrose, fructose, etc.); non-caloric or of reduced caloric content relative to sugar; can mimic non-taste properties of a solid sweetener (e.g., sugar) particle including one or more of bulk density, particle density, particle size and shape, texture, etc.; and can be relatively healthful by being one or more of: low in calories, low in fat or certain types of fat (e.g., trans fats), or may contain dietary fiber, constituents of whole grain, or both. Exemplary cores may contain a majority of non-sugar carbohydrate, e.g., oligo-saccharide, polysaccharides, starch, cellulose or a mixture thereof, in an amount of at least 35, 50, 70, 80, 90, or 95, 99, or 99.9 weight percent based on total weight of the core.

A core may optionally include a small amount of sugar, e.g., less than 10 percent, preferably less than 5, 2, or 1 percent sugar. Because sugar present in the core is not likely to increase a sweetness perception of the core-shell sweetener particles or a food product in which the core-shell sweetener particles are used as an ingredient, but will add to total sugar content as well as caloric content, sugar can be minimized or optionally excluded from the core; exemplary cores may include less than 1 weight percent sugar, e.g., less than 0.5 weight percent or less than 0.1 weight percent sugar based on total weight core.

If desired, a core may be aerated or otherwise processed to modify the particle density of the core particles or the bulk density of a collection of core particles in the form of a powder or dust. Processing by aeration may be useful to adjust bulk density or particle density of a core to mimic that of a desired composition of solid sweetener particles such as crystalline sugar, especially powdered sugar.

Core size can be a size such that a core-shell sweetener particle that is prepared by placing a sweetener layer onto the core will be in a desired range as described herein. As a general exemplary range, a core can be generally round and preferably spherical in shape; can be present in a collection of cores as a flowable, substantially non-agglomerative particulate fluid; and can have an average particle size of less than less 500 microns, less than 200 microns, or less than 100 or 50 microns as measured by a standard technique, e.g., using a Microtrac particle size analyzer or as sorted by one or more sieve of known size openings.

The sweetener layer contains sweetener or a combination of sweeteners in an amount to produce a sweet perception in a consumer. The sweetener can be any known or future developed natural or synthetic edible food sweetener ingredient including a nutritive carbohydrate sweetener (including but not limited to nutritive carbohydrate sweeteners referred to herein as sugars, see infra), a natural high intensity sweetener, a synthetic or artificial sweetener, or a combination of these types of sweeteners or sweet flavor enhancers. Any amount of sweetener can be useful based on the amount of sweetener layer; a useful amount of sweetener in a sweetener layer can be based on factors that include the desired sweetness level of a food or food ingredient and the inherent sweetening effect of the sweetener.

A nutritive carbohydrate sweetener can be any nutritive carbohydrate ingredient that includes a sugar. Generally, this includes carbohydrate materials derived from a natural plant source and concentrated to a food sweetener ingredient such as a sugar-containing syrup or soluble solid. General examples include concentrated sugar solids or syrups, corn syrup, high fructose corn syrup, dextrose syrup or solids, honey, molasses, and the like. In other variations, nutritive carbohydrates may be saccharides supplied by impure or flavored saccharidic ingredients such as fruit juices, purees, honey nectars, concentrated fruit, and the like. As used herein, the term "sugar" refers to nutritive carbohydrate sweeteners that are monosaccharide and di-saccharide sweeteners, including sucrose, fructose, dextrose, lactose, maltose, and galactose. Preferred sweetener layers can include a high concentration of one or more of these mono- and di-saccharide sugars, particularly sucrose, fructose, or a combination of sucrose and fructose. The nutritive carbohydrate sweetener in the sweetener layer can be crystalline or non-crystalline (e.g., amorphous) and is preferably dry (e.g., contains less than 10, 5, 2, or 1 percent water by weight).

Preferred sweetener layers can include one or more concentrated sugar, the most common sugars for use in food products as described herein, including RTE breakfast cereals, being sucrose and fructose. Preferred sweetener layers can include at least 50 weight percent sugar (e.g., sucrose, fructose, or both), such as at least 60, 80, 90, or 95 weight percent sugar.

Optionally a sweetener layer can also include a useful amount of artificial sweetener or high-intensity natural sweetener to adjust total sweetness of the sweetener layer as desired or necessary. Artificial sweeteners are known and include saccharine, aspartame, sucralose, potassium acetylsulfame, alitame, neotame, cyclamates, thaumatin, trehalose, tagatose, and other non-saccharide-based artificial or synthetic sweetening ingredients. High intensity natural sweeteners are also known and include as stevia, stevia extracts, lo han fruit extracts, and rubusoside. Any of these sweeteners can be included in a sweetener layer as described herein in a useful amount, which may be an amount to increase sweetness of a food product in which the core-shell sweetener particles are included as an ingredient. A useful amount of artificial sweetener, high-intensity natural sweetener, or a combination of these, may be less than 1 percent by weight (dry basis) or less than about 0.5 or 0.1 percent by weight (dry basis), based on the total weight of the sweetener layer, for certain artificial sweeteners, or as low as 100 parts per million or below, 50 parts per million or below, or 10 parts per million or below for certain high-intensity sweeteners, based on the total weight of the sweetener layer.

In certain embodiments, a sweetener layer can be free of (i.e., contain 0.5 weight percent or less on a dry basis) any ingredient from the family of bulk sweeteners known as polyols or sugar alcohols such as sorbitol, xylitol, lactitol, erythritol, and/or maltitol. In another embodiment, these sugar alcohols may be part of the sweetener layer.

The core-shell sweetener particles include the core, the sweetener layer, and can in certain preferred embodiments contain no additional layers or ingredients, although additional layers or ingredients may also be useful or desired. The relative amounts of core and sweetener layer can be as desired and can depend on factors such as the composition of the sweetener layer and the intended use and function of the core-shell sweetener particles. Preferably, the amount of sweetener layer can be sufficient to provide the core-shell sweetener particles, sweet particle composition, or a food product containing one of these, with a desired level of sweetness; the amount of sweetener layer can desirably be a relatively low or minimum amount that is still sufficient for the sweetener layer and the sweetener particles to provide desired sweetness to a sweetener composition or a food product containing the sweetener particles.

As an example, while relative amounts of core and sweetener layer that are outside the following ranges may also be useful, sweetener particles may individually or on average (in a collection of sweetener particles) contain at least 20 or at least 40 percent by weight core and not more than 80 or 60 percent by weight sweetener layer; e.g., from about 1 to 50 weight percent sweetener layer and from 50 to 99 weight percent core, or from about 5 to 30 weight percent sweetener layer and from about 95 to 70 weight percent core, or from 10 to 25 weight percent sweetener layer and from about 75 to 90 weight percent core.

One specific example of an embodiment of core-shell sweetener particles can be those that mimic solid sweetener particles of a powdered sugar ingredient by containing a sweetener layer having a high concentration of sugar, especially sucrose, fructose, or a combination of sucrose and fructose. The core may be any useful food ingredient, preferably being a non-sugar ingredient such as a non-sugar carbohydrate (e.g., starch). These preferred core-shell sweetener particles may be useful substitutes to previous solid sweetening particles and sweetener ingredients such as powdered sugar, and are able to be used in place of powdered sugar, allowing for a reduced amount of sugar in a food product while still providing desirable sweetening effect and non-sweetening (physical and mechanical) properties. According to these embodiments of core-shell sweetener particles, a sweetener layer may contain at least 50, 60, 70, 80, 90, 95, or 99 weight percent sugar (sucrose, fructose, or a combination of these) based on the total weight of the sweetener layer.

Exemplary core-shell sweetener particles that have relative amounts of core and sweetener layer (i.e. shell) as described above (e.g., less than 60 percent by weight sweetener layer), and that include a sweetener layer that includes a concentrated level of sweetener as described (e.g., from 50 to 99 or more weight percent sweetener, such as sugar), can contain a total amount of sweetener that is substantially less than solid sweetener particles having a solid particle composition that is the same as the composition of the sweetener layer (i.e., shell) of the core-shell particles. Examples of core-shell sweetener particles may contain a total amount of sweetener, e.g., sugar, that is up to about 80 weight percent based on the total weight of the core-shell sweetener particles, such as less than 60 weight percent sweetener (e.g., sugar), e.g., less than 50 40, 30, 20, 10, or 5 weight percent sweetener (e.g., sugar), based on the total weight of the core-shell sweetener particles or a collection of core-shell sweetener particles.

The core-shell sweetener particles can be prepared by known methods of producing coated solid particles in a size range of a fraction of an inch, e.g., under 1000, 500, 300, or 200 microns, or smaller. Useful method for forming a core or a collection of cores include methods of forming dry particulates such as agglomeration and spray drying methods, pulverization, or grinding, among other methods. The particles, once produced by one of these or other methods, can be sorted (e.g., by use of sieves), screened, and categorized by size to produce a collection (e.g., powder) of core particles having size, particle density, and bulk density properties useful to produce a suitable core-shell sweetener particle upon coating a sweetener layer onto surfaces of the core particles. Once the core particles are formed and optionally sorted to produce a collection (e.g., powder) of core particles having desired size properties, the sweetener layer can be applied by known methods such as spray coating, fluidized bed coating, agglomeration, steam agglomeration, or other methods of producing a coating on a collection of micron-scale particulates; some of these methods are of the type generally referred to in the particulate coating arts as encapsulation coating methods. According to various such processes, the sweetener layer can be applied as a liquid or as a solid; e.g., as liquid or dissolved sweetener, or as solid sweetener particles that can be cause to agglomerate on the outside surface of the core particles.

Useful examples of steps and overall methods for preparing a collection of edible core particles, then coating the core particles with an exterior or shell layer, are described in U.S. Pat. No. 4,828,856, the entirety of which is incorporated herein by reference. Therein, cores are prepared by methods such as sheeting and pulverization. The cores are coated by what are referred to as "standard fluidized bed granulation techniques." See also U.S. Pat. No. 4,824,681, the entirety of which is incorporated herein by reference. While none of these references shows the preparation of core-shell sweetener particles of the present description, containing a sweetener layer at an exterior, one of skill will be capable of applying the described methods to prepare the core-shell sweetener particles described herein.

The core-shell sweetener particles can be used in a sweetener composition for use in a food product. Sweetener compositions as described herein can be any edible food ingredient that contains the core-shell sweetener particles as described herein in an amount that allows the sweetener composition to provide a sweet taste when included as an ingredient in a food product, e.g., in or as a coating on a surface of the food product, or at an interior of the food product. The sweetener composition can be in any form that contains and maintains the intact core-shell sweetener particles in a stable form and condition; uses in a food ingredient can include uses that also maintain the intact core-shell sweetener particles. Exemplary sweetener compositions can be in the form of a dry, flowable dust or powder composition that can be processed by known food processing techniques, e.g., coating techniques. Examples of such dry sweetener compositions include dry, flowable powder or dust compositions (a.k.a., a "sweet powder") that can be applied in a dry form onto a surface of a food product, such as by techniques sometimes referred to as any one of a powder coating, dry particle coating, or dry coating technique. Particular dry powders (e.g., sweet powders that contain up to about one-hundred percent coated sweet particles) for use as a food ingredient can exhibit at least some physical properties that are the same as or comparable to known dry food ingredients made up of solid particles, e.g., powdered sugar, baking powder, starch, flour, granulated sugar, or cocoa powder or cinnamon (other than coloration), etc.

An example of one form of sweetener composition is a sweet powder that contains a major amount of the core-shell sweetener particles as described, for example at least 50 percent by weight, or at least 60, 70, 80, 90, 95 or up to or in excess of 99 or 99 weight percent core-shell sweetener particles based on total weight sweet powder. The balance of the sweet powder may be any other useful or desired food ingredients (GRAS) such as a fat, non-sugar carbohydrate, protein, flavorant, colorant, nutritional ingredient (e.g., vitamin or mineral), processing aid, or other ingredient or adjuvant useful or desired in a sweet powder or a food product, and that will not cause the core-shell sweetener particles to substantially become broken, degraded, dissolved, or otherwise damaged. The core-shell sweetener particles can include sugar in an amount that is reduced, preferably substantially reduced, relative to comparable solid sweetener particles made of sweetener that is the same as the composition of the sweetener layer of the core-shell sweetener particles; for example core-shell sweetener particles can contain less than 80 weight percent sugar, or less than 60 weight percent sugar, e.g., less than 50, 40, 30, 20, 10, or less than 5 weight percent sugar based on total weight of a collection of core-shell sweetener particles or a sweetener composition containing a collection of the core-shell sweetener particles.

Certain specific embodiments of sweet powders may be useful as a replacement or substitute for a powdered sugar ingredient in a food product or coating. Such core-shell sweetener particles can be designed and prepared to exhibit taste, mechanical and physical properties, and functionality, that will allow the sweet powder to be used as a substitute for standard (approximately 100 percent sugar) powdered sugar. As an example, a sweet powder containing at least 95 or 99 weight percent of the core-shell sweetener particles can exhibit one or more of the typical properties of a standard powdered sugar, including taste (especially sweetness), particle size (average or mean), bulk density, particle density, color, and processing and handling properties such as the ability to flow and to be coated in dry form onto a substrate such as a food piece, and preferably to be held at the surface of the food piece by an adherent layer. Core-shell sweetener particles and sweet powders that exhibit taste and functional properties comparable to powdered sugar can provide comparable or identical utility and functionality, but will contribute a lower amount of total sugar to a sweetener composition, food coating, or food product, in which the core-shell sweetener particles or sweet powder is included as an ingredient.

Certain other examples of sweetener compositions such as sweet powders may include core-shell sweetener particles in combination with: one or more flavorant such as cocoa, cinnamon, salt (e.g., sodium chloride, potassium chloride), vanilla, or other flavorant; natural food additive such as lecithin, calcium carbonate, and the like; colorant such as titanium dioxide; or bulking material. A bulking material may be any one or more of soluble fiber, insoluble fiber, higher molecular weight polysaccharides, cellulose, maltodextrin, protein, starch, and the like, which can be useful to add mass (i.e., "bulk") to a sweetener composition without adding high levels of calories or flavor. Preferably any of these "additional" (non-sweetener particle) ingredients of a sweetener composition can be present in the form of particles that exhibit desired size, shape, density, and other physical properties that may be comparable to or similar to the same properties of the core-shell sweetener particles so that the core-shell sweetener particles and the additional non-sweetener particles can form a relatively homogeneous mixture or blend that can be processed and used as a food ingredient, e.g., by dry or powder coating. Although not necessary and preferably excluded from certain embodiments of sweetener compositions, a sweetener composition may (if necessary or desired) include other sweetener ingredients (i.e., other than the core-shell sweetener particles) including an additional amount of sugar or artificial or natural sweetener. A sweetener composition can preferably be dry, meaning that the sweetener composition contains less than 5 percent water, e.g., less than 2 or 1 percent water, based on the total weight of the sweetener composition.

The particle size of the core-shell sweetener particles can be as desired, generally less than 1000 microns, such as less than 500 microns, e.g., less than about 400 microns, or less than 200 or 100, on a volume average basis measured by a standard technique such as by using a Microtrac particle size analyzer or by sorting with one or more sieve of known opening sizes. Similarly, the particle size of particles of a sweet powder that contain the core-shell sweetener particles and optionally other particle ingredients in can be as desired, generally less than 1000 microns, such as less than 500 microns, e.g., less than about 400 microns, or less than 200 or 100, on a volume average basis measured by a standard technique such as by using a Microtrac particle size analyzer or by sorting with one or more sieves of known opening sizes. As one example, a collection of core-shell sweetener particles, e.g., as part of a sweet powder, can have average size such that at least 60% of a collection of particles such as a sweet powder will remain within a U.S. Sieve Number 50-100 (0.297-0.149 millimeter).

The bulk density of core-shell sweetener particles or a sweet powder can be as desired depending on factors such as the food product with which the core-shell sweetener particles will be included, the method of incorporating the core-shell sweetener particles into the food product (e.g., by dry coating), and, if the core-shell sweetener particles are to be coated onto an adherent layer, the makeup and amount (e.g., coating weight) of the adherent layer. Generally a bulk density of core-shell sweetener particles can be as desired, with an exemplary range being from 0.5 to 2 grams per milliliter. For specific use in a sweet powder that may be useful as a replacement for a powdered sugar ingredient, a sweet powder containing substantially only core-shell sweetener particles may have a bulk density in a range from 0.6 to 1.8, e.g., 0.7 to 1.6 grams per milliliter. Similarly, the bulk density of a sweet powder that contain the core-shell sweetener particles and optionally other ingredients in particle form can be as desired, e.g., in a range from 0.5 to 2, e.g., from 0.6 to 1.8 grams per milliliter, such as from 0.7 to 1.6 grams per milliliter, measured by a standard techniques.

The present description relates to food products that include the described core-shell sweetener particles, preferably at a surface of the food product and in an intact and un-dissolved condition wherein the particles retain their core-shell structure after preparation of the food product and at a time of a consumer placing the food product in his or her mouth. The core-shell sweetener particles may be present in the food product in any manner or location, with certain particular embodiments of food products containing a coating at an exterior surface of the food product (e.g., a sweetener coating) that includes the core-shell sweetener particles at the top layer or the exterior of the coating. At this location, the sweetener particles are also in an un-dissolved condition with the core-shell structure intact. The food product can be any food that may desirably include a sweetener ingredient such as a powdered sweetener within the food product or at a surface. Examples include baked food products such as bakery goods such as cookies (with a sweetener layer), cake, donuts, Danishes, frosting; snack foods such as snack bars, chips, snack mixes, dried fruit pieces, nuts or nut pieces, pretzels, and popcorn; candies such as sugar-coated hard candies; and breakfast cereals including those that include a sugar coating at the exterior of cereal pieces.

In certain embodiments, a food product can include a food product base (e.g., piece) and a sweetener layer that contains the core-shell sweetener particles in the form of a sweet powder that is applied by a dry coating or a powder coating method. The sweetener layer can optionally include an adherent layer capable of holding the core-shell sweetener particles to the food piece surface by application of the adherent layer to the food product followed by application of the core-shell sweetener particles (e.g., in the form of a dry powder) to the adherent layer. The adherent layer may be made of any edible food ingredient or combination of edible food ingredients capable of holding the core-shell sweetener particles at a surface of a food product, with examples including a solid or liquid fat, a sugar ingredient, a liquid (e.g., syrup) or solidified (solidified syrup) saccharide or carbohydrate, or any useful combination of these or other food ingredients.

A fat useful in an adherent layer can be any edible fat that by itself or in combination with other ingredients (e.g., sugar, nutritive carbohydrate, water, flour, starch, protein, fiber ingredient) is capable of being coated onto a food piece, then contacted with core-shell sweetener particles to hold the core-shell sweetener particles to the food piece. The fat may be a room temperature solid or a room temperature liquid, and if a room temperature solid the fat can be heated for processing and application to a food piece. Examples of useful fats include hydrogenated and non-hydrogenated vegetable oils such as cottonseed oil, soybean oil, palm oil, palm kernel oil, coconut oil, and mixtures thereof. Other examples include low-trans fatty acid liquid vegetable oils such as canola oil, corn oil, cottonseed oil, olive oil, palm oil, rapeseed oil, rice bran oil, safflower oil, soybean oil, sunflower oil, or mixtures thereof. Low trans fatty acid vegetable oils typically have about 5 weight percent or less trans fatty acids. The terms "fat" and "oil" are used interchangeably herein to refer to all types of fats and oils, including room temperature solid fat materials that may generally be referred to as "oils," as well as fats or oils that are solid at room temperature.

One general example of a type of adherent layer is an adherent layer made substantially of fat and little or no non-fat ingredient; such an adherent layer may contain a majority of fat, such as at least 50, 60, 70, 80, 90 or 95 percent or more fat based on total weight of the adherent layer. Alternate adherent layers may be made of one or a combination of fat, sugar, and non-sugar carbohydrates. One example of an adherent layer made using a combination of fat, sugar, and protein is described in WO 2011/011271, the entirety of which is incorporated herein by reference.

An example of a structure of a sweetener coating at a surface of a food piece (e.g., a cereal piece) is shown at FIG. 2. FIG. 2 shows an example of a surface of a coated food product (10) such as a sugar-coated cereal piece according to the present description. Sugar coated food piece 10 includes food piece (e.g., cereal piece) 12 and sweetener coating 14 present at a surface of food piece 12. Sweetener coating 14 includes adherent layer 16 and core-shell sweetener particles 2. Core-shell sweetener particles 2 include a core and sweetener layer (these details are not shown at FIG. 2, but see FIG. 1B) and can preferably be located predominantly at a top or exterior surface of sweetener coating 14 so a consumer of coated food piece 10 will experience core-shell sweetener particles 2 at the consumer's tongue, thereby tasting the sweetener present in the form of the sweetener layer 6 (see FIG. 1B) located at the exterior of core-shell sweetener particles 2.

Optionally, for a food product that is a ready-to-eat cereal, a food piece as described can be made of the food piece and the sweetener coating with no additional coating or food ingredient being located on top of the sweetener coating. As illustrated at FIG. 2, sweetener coating 14 can include the core-shell sweetener particles placed onto the food product (e.g., cereal piece) and held to the food piece by adherent layer 16. The food product includes the food (e.g., cereal) piece or pieces, the adherent layer, and the core-shell sweetener particles, with no material or coating placed over the core-shell sweetener particles 2 of sweetener coating 14. The sweetener particles (2) are held to the food (e.g., cereal) piece by the adherent layer (16) and no additional material is necessary (e.g., over the core-shell sweetener particles) to hold the core-shell sweetener particles (2) in place. In alternate embodiments a sweetener coating 14 may be contain two or more different materials or layers that each contain a different type of sweetener, such as a layer containing artificial sweetener or a non-sugar natural sweetener disposed adjacent to a layer that contains sucrose, with either the non-sugar sweetener, the sucrose, or both being present at an exterior of core-shell sweetener particles.

For food products generally, an amount of sweetener coating (meaning an adherent layer, if present, and core-shell sweetener particles or sweet powder) that can be placed onto a food piece can be any amount that places a desired amount of core-shell sweetener particles (and, therefore, sweetener, e.g., sugar such as sucrose, fructose, etc.) at a surface of the food piece, to produce a desired level of sweet flavor of the coated food piece or food product. The amount can be selected based on the type and amount of sweetener desired, the level of desired sweetness, the composition of the balance of the food product, and non-taste considerations such the appearance and nutritional properties desired in the coated food product.

The amount of coating material to produce an adherent layer can be an amount that will allow for placement of the core-shell sweetener particles or a sweet powder on the adherent layer, and that will cause a desired amount of core-shell sweetener particles or other sweet powder particles (e.g., flavorant, colorant, etc.) that contact the adherent layer to become secured to the adherent layer and not fall off during subsequent processing or subsequent handling of the product prior to use by a consumer. The amount of the adherent layer can be selected in a manner that accounts for factors including the size, shape, and particle density of core-shell sweetener particles (and optional non-sweetener particles) being coated onto the adherent layer; the adhesive properties of the adherent layer (which depend on the makeup of the adherent layer, e.g., nutritive carbohydrate, fat, and particular identity thereof, etc.); processing considerations such as whether the adherent layer is heated when applied; and the desired coating weight of core-shell sweetener particles. Higher particle density of core-shell sweetener particles, greater size of the core-shell sweetener particles, and higher coating weight of the core-shell sweetener particles being applied to a food piece, may require a higher coating weight of the adherent layer or use of an adherent layer with relatively greater adhesive properties relative to the core-shell sweetener particles; lower particle density of core-shell sweetener particles, smaller size of core-shell sweetener particles, and lower coating weight of the core-shell sweetener particles may allow for a lower coating weight of the adherent layer.

Food pieces in the form of pre-sweetened (i.e., sugar coated) cereal pieces, and compositions of the pre-sweetened cereal pieces, can contain any desired and useful relative amounts of the food (dried cereal) pieces, adherent layer, and core-shell sweetener particles or sweet powder. Desired amounts can depend on desired features of the cereal product, such as the sweetness level and the amount of sugar (e.g., sucrose) desired for the cereal product. According to desired uses of the invention whereby the core-shell sweetener particles as described are used as a replacement or substitute for powdered sugar, the total amount of sugar in a cereal that contains the described core-shell sweetener particles will be lower than the same cereal having the same composition but containing a similar amount (by mass) of solid sweetener particles such as in the form of powdered sugar; preferably taste, texture, coloration, and other non-taste features of the cereal product containing the core-shell sweetener particles can be the same or at least comparable to the same cereal product otherwise of the same composition but containing solid sweetener particles instead of the core-shell sweetener particles.

The use of the described core-shell sweetener particles can reduce the total amount of sugar (sucrose, fructose, etc.) present in a sweetener coating (e.g., a sugar coating) of a ready-to-eat cereal product and thereby reduce the total amount of sugar present in the overall cereal product. In specific examples, the total amount of sugar in a sweetener coating that contains the core-shell sweetener particles may be, for example, in a range from about 5 to about 80 weight percent sugar, based on the total weight of the sweetener coating. Such a sweetener coating is considered to be "sucrose-reduced," or "reduced sugar," in that many current or conventional breakfast cereal sweetener coatings include at least 80 weight percent sugar (e.g., sucrose), e.g., from about 80 to about 95 weight percent (dry basis) sucrose.

Because cores of the core-shell sweetener particles can include substantial amounts of non-sugar ingredient, the total amount of sugar included in a pre-sweetened cereal that contains the core-shell sweetener particles can be reduced compared to the total amount of sugar in a cereal that is otherwise the same but that uses convention solid sweetener particles (e.g., powdered sugar); preferably, the reduction in sugar does not affect the sweetness or other taste properties of the cereal or non-taste properties such as "bulk," color, sheen, texture, etc.

According to certain embodiments, core-shell sweetener particles can be used in place of solid powdered sugar sweetener particles in a sweetener coating. The amount of reduction in sugar of the sweetener coating will be related to the amount of the non-sugar core of the core-shell sweetener particles used in the sweetener coating. Whereas many pre-sweetened breakfast cereals that use conventional solid sweetener particles in a sweetener coating may contain from about 5 to about 35 weight percent total sugar, this amount can be reduced in a pre-sweetened breakfast cereal that uses the core-shell sweetener particles in place of conventional solid sweetener particles in the sweetener coating; the reduction in total sugar content of the pre-sweetened cereal may be about the weight of the core of the core-shell sweetener particles, e.g., a reduction in total sugar in an amount from about 20 to about 80 percent, such as from about 40 to about 80 percent, compared to the amount of sugar that would be present in a similar cereal containing solid sugar particles.

Stated in terms of sugar per serving size, some pre-sweetened RTE cereals include a sweetener coating prepared using standard powdered sugar (which contains solid sugar particles); these cereals may contain from about 2 to 20 grams (e.g., 9 grams) of sugar per 31 gram serving of the pre-sweetened cereal, with from 0 to 20 percent of the total sugar being present in the dried cereal piece and the balance of the sugar being is present in the sweetener coating. Replacing the solid sweetener particles of the powdered sugar in the sweetener coating with core-shell sweetener particles as described herein can substantially reduce the total amount of sugar in the cereal, e.g., total sugar content may be reduced by an amount of from 20 to 80 percent; preferably, the reduction in sugar does not affect the sweetness or other taste properties of the cereal, or non-taste properties such as "bulk," color, sheen, texture, etc. By way of example, the same pre-sweetened cereal, if core-shell particles are included in the sweetener coating to replace the solid sweetener particles of the powdered sugar, may contain from 2 to 16 grams, such as from 2 to 8 grams (e.g., 6 grams) of sugar per 31 gram serving total sugar.

Exemplary food pieces for use with the core-shell sweetener particles can be any of various food product types that can contain sweetener particles as an ingredient or as part of an ingredient, including but not necessarily as an ingredient of a sweetener coating such as a sweet powder. According to certain described embodiments, a sweetener coating and related methods can involve dried cereal pieces that are coated with a sweetener coating. A cereal piece can be of any dried cereal type that may desirably be provided with a sweetened coating, e.g., a ready-to-eat or "RTE" cereal piece.

RTE cereal products can include, for example, a cereal piece as the food piece comprising pieces or quantities of puffed or unpuffed grains, grain-derived ingredients such as flours and starches, and the like. A cereal piece can be a commonly shaped and sized piece, such as piece in the form of a flake, puff, shred, biscuit, "O" letter, figure, biscuit, nugget, shredded piece, spheres, square, and mixtures thereof, fabricated from a cooked cereal dough. The cereal piece can alternately be in the form of puffed pieces of wheat, rice, corn, etc. In some embodiments the cereal pieces are dried food pieces having a moisture content of about 1 to about 5 percent by weight after drying. Any conventional or future-develop cereal piece may be useful, with many varieties and their methods of preparation being well understood in the food arts.

Any conventional puffed or unpuffed cereal or method of preparation can be used to provide cereal piece for use in the described methods and food products. The food and cereal arts include numerous examples of such cereal pieces and cereal compositions; the skilled artisan will be capable of identifying and selecting suitable compositions and methods of preparation. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F.

Glabe, et al.); U.S. Pat. No. 3,246,990, (issued Apr. 19, 1966 to Thompson, et al.); and U.S. Pat. No. 3,687,687, (issued Aug. 29, 1972 to A. L. Liepa). Other examples are described at U.S. Pat. No. 5,342,188.

A food product that includes a sweetener coating as described, containing core-shell sweetener particles, can be prepared and applied to a food product (e.g., a food piece) by any method that will result in a desirable sweetener coating and coated product. The sweetener coating is not limited to preparation by any particular method. Still, certain methods of forming a sweetener coating on a food piece may be especially effective.

A sweetener coating can be applied to a food piece by known coating methods of placing sweetener ingredients onto food pieces, such as by known methods of placing a food ingredient in the form of a powder or dust composition onto a food surface. Examples of steps or processes include those known referred to in the food product arts as "powder coating" or "dry particle coating" processes by which dry particles (e.g. powdered sugar or a similar dry powder) are applied in dry form as an even coating at a surface of a food piece. According to one presently understood example of a useful method, a sweetener coating can be applied to a food piece by a sequence that first provides a food piece having an exterior surface. An adherent layer is applied to at least a portion of the exterior surface of the food piece. Core-shell sweetener particles, preferably in the form of a sweet powder (optionally including additional particle ingredients), can then be applied to the adherent layer in a manner to cause a desired amount of the sweet powder (core-shell sweetener particles and any other particle ingredients in the sweet powder) to adhere to the surface of the food piece.

By such methods, a sweetener coating can be made of one or multiple coating materials applied to a food piece. A "coating material" refers to a food component (e.g., adherent layer, sweet powder, etc.) before or upon application to a surface of the food piece. Examples of coating materials include an adherent material (before or during application to a food piece) and a sweet powder (before or during application to the food piece). Each of these coating materials will include a portion of the ingredients that will make up the sweetener coating. The applied coating materials in final form after application to the food piece can be referred the "sweetener coating" (as opposed to a "coating material").

Accordingly, examples of processes useful for forming a sweetener coating on a surface of a food piece can include application of an adherent layer to a surface of a food piece followed by application of core-shell sweetener particles, or a sweet powder that contains core-shell sweetener particles, to the adherent layer. The coating materials may be applied by known methods used for depositing liquid or dry particulate food ingredients onto a surface of a food piece. Examples include coating processes commonly referred to as dry coating, dust coating, dry particle coating, powder coating, tumbling, and enrobing processes for applying dry particles such as dust or powder (e.g., for applying the core-shell sweetener particles or sweet powder), and spray coating processes, curtain coating processes, tumbling, and enrobing processes for applying a wet or liquid coating material such as a liquid adherent material.

Depending on the specific ingredients and types of coating materials used in a coating process, the process may include steps of applying one or more coating materials, and optionally steps of heating, cooling, or drying a coating material after application to the food piece. If a coating material is solid at room temperature (e.g., a room temperature solid fat), the coating material may be heated to a temperature above room temperature and applied as a liquid. Optionally, even if a coating material such as an adherent material is liquid at room temperature (e.g., a nutritive carbohydrate syrup or a room temperature liquid fat), the coating material may still be heated to a temperature above room temperature and applied as a heated liquid, to facilitate the coating process. If a coating material is applied as a heated liquid, the coated food pieces can be processed by cooling or by being allowed to cool, to cause the liquid to cool or solidify. If a coating material includes water, water can be removed from the coating material by drying, as is known.

In somewhat more detail, for certain contemplated coating processes, a liquid coating material in the form of an adherent material can be applied to surfaces of a collection of cereal pieces, to produce an adherent layer on the pieces. After application of the adherent material, core-shell sweetener particles can be applied in a dry form such as a sweet powder using a process that allows the dry core-shell sweetener particles to become adhered to the applied adherent material. The core-shell sweetener particles can preferably exhibit physical and mechanical properties that allow the dry core-shell sweetener particles to be applied as a dry powder or as a component of a dry powder, such as by a "dry coating" or a "dry charge" method, to the coated adherent layer. For example, the core-shell sweetener particles can have a combination of bulk density, particle density, shape, and size (e.g., dimensions), that allows the core-shell sweetener particles to evenly contact the cereal pieces and stick as an even coating on the adherent layer. Heavier particles, due to a large size, may tend to fall off of a food piece after contact; particles that are lighter due to small size or low density may be so insubstantial as to not provide a uniform coating or desirable cosmetic properties; particles that exhibit a relatively low particle density (e.g., compared to solid sugar particles of a powdered sugar composition) can also be difficult to coat. The core-shell sweetener particles should be capable of flowing as a fluid and should not substantially agglomerate during a coating process. Examples of certain presently preferred dry sweet powder ingredients that contain core-shell sweetener particles, for use in a dry coating method, may exhibit physical properties comparable to powdered sugar.

An exemplary method of preparing a sweetener coating using a dry charge method is shown at FIG. 3A. The method includes a step of applying an adherent material 80 to a surface of a food piece (e.g., cereal piece) 12 to form an intermediated cereal piece 11 with a coating of the adherent material at a surface of the cereal piece. Dry sweetener particles (e.g., 2, not specifically shown at FIG. 3A) can be applied to the adherent-material-coated pieces as part of sweet powder 90, by exposing the intermediate adherent-layer-coated cereal pieces 11 to a dusting of sweet powder 90, which contains the dry core-shell sweetener particles (2). See FIG. 3A.

The adherent layer coating material (or "adherent material") (80) can be made of food ingredients described herein as useful for an adherent layer, with particular embodiments containing from about 40 to about 100 weight percent fat, e.g., from about 50 to about 95 or 99 weight percent fat, based on the total weight of the adherent layer. The sweet powder (90) can be as described herein, preferably containing a high concentration of core-shell sweetener particles, e.g., up to 90, 95, 99 or about 100 weight percent core-shell sweetener particles based on the total weight of the sweet powder; optionally, non-sweetener particles can be included in a desired amount. The sweetener particles can preferably contain a sweetener layer 6 that includes a high concentration of sugar (e.g., fructose, sucrose, or a combination of these), such as at least 80, 90, 95, or 99 weight percent sugar.

Figure 3B:
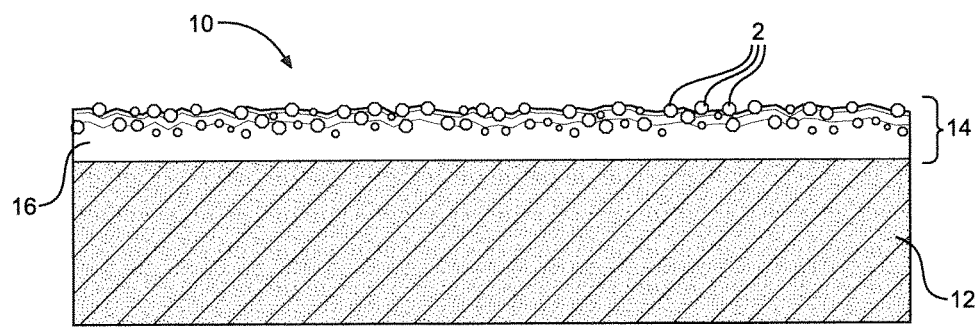
FIG. 3B shows an example of a coated food piece.

FIG. 3B illustrates an example of coated food piece 10 prepared according to a dry charge method shown at FIG. 3A. Coated food (e.g., cereal) piece 10 includes food piece 12 and sweetener coating 14, which includes adherent layer 16 and sweetener particles 2 (and, optionally other particle ingredients).

The present description is intended to be illustrative and not restrictive. For example, the above-described embodiments and variations can be used in combination with each other. Many other embodiments will be apparent to those of skill in the art upon reviewing the above description. The scope of the invention should, therefore, be determined with reference to the appended claims, along with the full scope of equivalents to which such claims are entitled. While the invention has been described in connection with what is presently considered to be useful embodiments, it is to be understood that the invention is not to be limited to the disclosed embodiment, but on the contrary is intended to cover various modifications and equivalent arrangements included within the spirit and scope of the appended claims. All referenced patents and patent application herein are hereby incorporated by reference.

The invention claimed is:

1. A powder composition comprising core-shell sweetener particles consisting of an edible core and a nutritive carbohydrate sweetener layer on the edible core and at a particle exterior, the core-shell sweetener particles comprising less than 80 weight percent sweetener layer based on total weight of core-shell sweetener particles, wherein the sweetener layer is in the form of solid particulates agglomerated on an outside surface of the edible core.

2. A powder composition as recited at claim 1 wherein the edible cores of the core-shell sweetener particles comprise less than 10 weight percent sugar based on the weight of the edible cores.

3. A powder composition as recited at claim 1 wherein the core-shell sweetener particles comprise less than 50 weight percent sugar based on total weight of core-shell sweetener particles.

4. A powder composition as recited at claim 1 wherein the powder composition is a dry flowable powder containing less than 10 weight percent water.

5. A powder composition as recited at claim 1 wherein the core-shell sweetener particles comprise from 20 to 95 weight percent edible core and from 5 to 80 weight percent sweetener layer.

6. A powder composition as recited at claim 1 wherein the sweetener layer contains at least 50 weight percent sugar.

7. A powder composition as recited at claim 1 wherein the core-shell sweetener particles exhibit a bulk density in a range from 0.5 to 2 grams per milliliter.

8. A powder composition as recited at claim 1 wherein the core-shell sweetener particles exhibit an average particle size below about 1000 micron.

9. A powder composition as recited at claim 1 wherein
the core comprises at least 95 weight percent edible food ingredient selected from fat, protein, polysaccharide, carbohydrate, starch, fiber, soluble fiber, and combinations thereof, and
the core comprises less than 5 weight percent sugar.

10. A powder composition as recited at claim 1 comprising
at least 80 weight percent of the core-shell sweetener particles, and
up to 20 weight percent non-sweetener flavorant particles.

11. A powder composition as recited at claim 1 comprising:
from about 90 to about 99 weight percent core-shell sweetener particles comprising a sweetener layer comprising at least 80 weight percent sugar,
from about 1 to about 10 weight percent non-sweetener particles, and
less than about 5 weight percent water, based on total weight powder composition.

12. A powder composition as recited at claim 1 wherein the core-shell sweetener particles comprise:
from 25 to 70 weight percent sugar, and
from 30 to 75 weight percent non-sugar ingredient, based on total weight of core-shell sweetener particles.

13. The powder composition of claim 1, wherein the edible core is selected from the group consisting of oligosaccharides, polysaccharides, starch, cellulose and a mixture thereof.

14. The powder composition of claim 1, wherein the average size of the core-shell sweetener particles is such that at least 60% of the particles remain within a US sieve Number 50-100.

15. A food product comprising a sweetener coating, the food product comprising a food piece and the sweetener coating at a surface of the food piece, the sweetener coating including a powder composition comprising core-shell sweetener particles consisting of an edible core and a nutritive carbohydrate sweetener layer on the edible core and at a particle exterior, the core-shell sweetener particles comprising less than 80 weight percent sweetener based on total weight of core-shell sweetener particles, wherein the sweetener layer is in the form of solid particulates agglomerated on an outside surface of the edible core.

16. A food product as recited at claim 15 wherein the core-shell sweetener particles are present at the surface of the food product.

17. A food product as recited at claim 15 wherein the core-shell sweetener particles comprises from 10 to 80 weight percent sugar.

18. The food product of claim 15, wherein the average size of the core-shell sweetener particles is such that at least 60% of the particles remain within a US sieve Number 50-100.

19. A food product as recited at claim 15 wherein the sweetener coating comprises an adherent layer at a surface of the food piece and the adherent layer holds the core-shell sweetener particles at an exterior of the food piece.

20. A food product as recited at claim 19 wherein the food piece is a cereal piece and the food product comprises pre-sweetened cereal pieces comprising:
from 50 to 90 weight percent cereal pieces as the food piece, and
from 7 to 35 weight percent core-shell sweetener particles.

21. A method for preparing a food product, the method comprising:
providing a food piece having an exterior surface;
applying a powder composition to the exterior surface, the powder composition comprising core-shell sweetener particles consisting of an edible core and a nutritive carbohydrate sweetener layer on the edible core and at a particle exterior, the core-shell sweetener particles comprising less than 80 weight percent sweetener based on total weight of core-shell sweetener particles, wherein the sweetener layer is in the form of solid particulates agglomerated on an outside surface of the edible core.

22. The method of claim 21, wherein the edible core is non-sweet.

* * * * *